(12) United States Patent
Yokochi et al.

(10) Patent No.: US 9,626,865 B2
(45) Date of Patent: Apr. 18, 2017

(54) TRAFFIC SIGN DETERMINATION DEVICE

(71) Applicant: HONDA MOTOR CO., LTD., Minato-ku, Tokyo (JP)

(72) Inventors: Yuji Yokochi, Wako (JP); Hirotaka Takiguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/070,394

(22) Filed: Mar. 15, 2016

(65) Prior Publication Data
US 2016/0275793 A1 Sep. 22, 2016

(30) Foreign Application Priority Data

Mar. 18, 2015 (JP) .................................. 2015-054383

(51) Int. Cl.
*G08G 1/0962* (2006.01)
*B60R 1/00* (2006.01)
*G06K 9/00* (2006.01)

(52) U.S. Cl.
CPC ..... *G08G 1/09623* (2013.01); *G06K 9/00818* (2013.01); *G08G 1/09626* (2013.01)

(58) Field of Classification Search
CPC .............................. G08G 1/09623; B60R 1/00
USPC .......................................................... 701/36
See application file for complete search history.

(56) References Cited

U.S. PATENT DOCUMENTS

2007/0050130 A1* 3/2007 Grimm ............ G08G 1/096716
701/420

2015/0367779 A1* 12/2015 Ohdachi .............. G08G 1/0967
340/905
2016/0117923 A1* 4/2016 Dannenbring ......... G01C 21/32
340/905

FOREIGN PATENT DOCUMENTS

JP       2012-185076 A       9/2012
JP       2015102898 A        6/2015

OTHER PUBLICATIONS

Office Action issued on Oct. 11, 2016 for corresponding Japanese Patent Application No. 2015-054383 with English machine translation.

* cited by examiner

*Primary Examiner* — Yazan Soofi
(74) *Attorney, Agent, or Firm* — Carrier Blackman & Associates, P.C.; Joseph P. Carrier; Jingli Wang

(57) ABSTRACT

An image recognition section detects a first traffic regulation sign from a picked-up image of an area in front of a vehicle. An acquisition section uses a position of the vehicle to acquire a road link, including a second traffic regulation sign at the position of the vehicle, from a storage section. When no current first traffic regulation sign is detected on a current road link after turning-right or turning-left of the vehicle, a determination section determines a current final traffic regulation sign on the current road link, which is to be notified to a vehicle occupant, by use of a degree of adequacy of cooperation between previous first and second traffic regulation signs detected and acquired on a previous road link before the turning-right or turning-left of the vehicle, but also previous and current factors acquired on the previous and current road links.

9 Claims, 4 Drawing Sheets

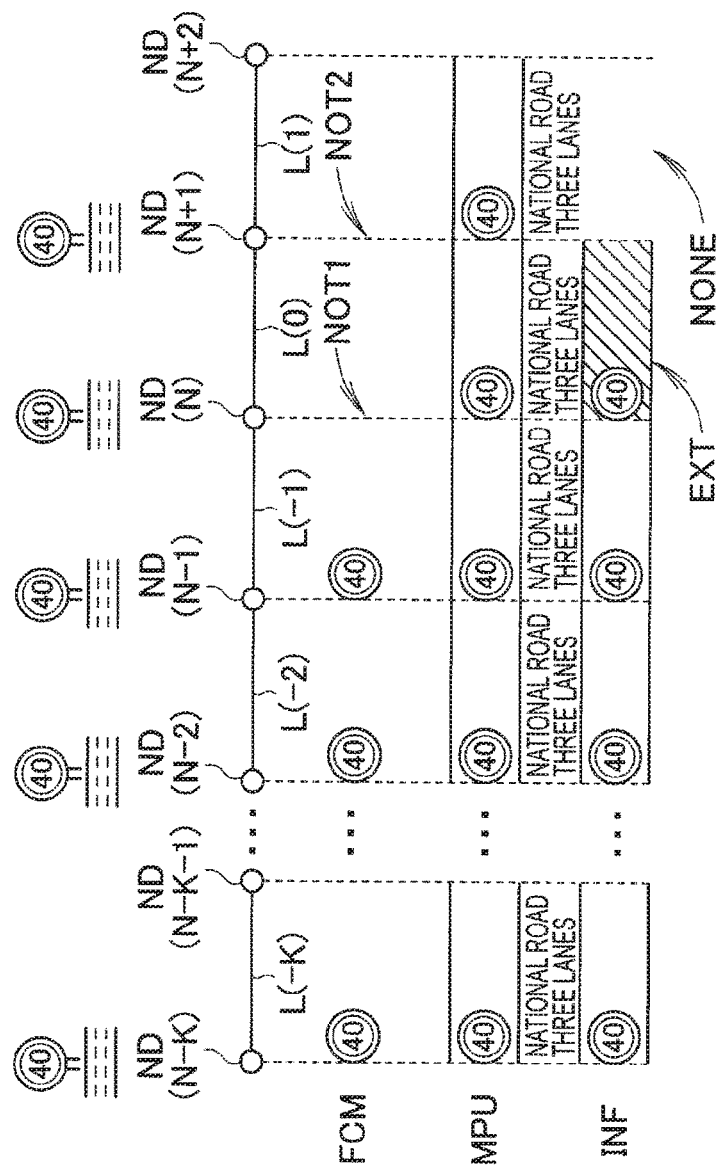
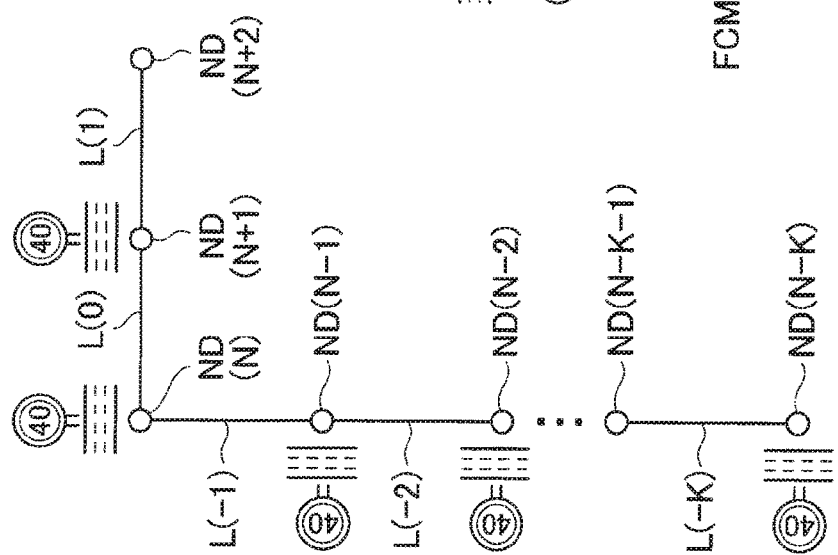

TRAFFIC SIGN DETERMINATION DEVICE

FIELD OF THE INVENTION

The present invention relates to devices for determining a road or traffic sign (final traffic sign) to be notified to an occupant of a vehicle by use of both a traffic sign based on a picked-up image and a traffic sign based on map data.

BACKGROUND OF THE INVENTION

Japanese Patent Application Laid-open Publication No. 2012-185076 discloses a speed limit value notification device which is capable of using both a traffic sign detected from an image picked up by a vehicle-mounted cameral and a traffic sign acquired from map data stored in a map data storage section.

However, the speed limit value notification device disclosed in the No. 2012-185076 publication is constructed to merely determine whether or not the traffic sign based on the picked-up image and the traffic sign based on the map data agree with, or match, each other. Thus, when no traffic sign based on the picked-up image is detected, the speed limit value notification device disclosed in the No. 2012-185076 publication cannot determine a final traffic sign to be notified to an occupant of a vehicle. Namely, the inventors of the present invention etc. realized that, with the speed limit value notification device disclosed in the No. 2012-185076 publication, a probability or time period with or for which a final traffic sign can be notified to the vehicle occupant is low or short. The inventors of the present invention etc. realized that, in the case where a final traffic sign is determined with no traffic sign detected based on the picked-up image, a probability of an error existing in the final traffic sign to be notified the vehicle occupant should be lowered.

SUMMARY OF THE INVENTION

In view of the foregoing prior art problems, it is an object of the present invention to provide an improved traffic sign determination device capable of accurately determining a final traffic sign to be notified. Other objects of the present invention will become apparent to a person skilled in the art with reference to the following illustrative description of preferred embodiments and the accompanying drawings.

According to a first aspect of the present invention, there is provided an improved traffic sign determination device, which comprises: an image recognition section which detects a first traffic regulation sign by performing an image recognition process on an image of an area in front of a vehicle picked up by an imaging section provided on the vehicle; a map information acquisition section which, using a position of the vehicle, acquires a road link, including a second traffic regulation sign at the position of the vehicle, from a map data storage section storing map data that includes road link information related to roads constituting a map; and a traffic sign determination section which, when no current first traffic regulation sign is detected on a current road link after turning-right or turning-left of the vehicle, determines a current final traffic regulation sign on the current road link, which is to be notified to an occupant of the vehicle, by use of not only a degree of adequacy of cooperation between previous first and second traffic regulation signs detected and acquired on a previous road link before the turning-right or turning-left of the vehicle, but also previous and current factors acquired on the previous and current road links.

According to the first aspect, when no current first traffic regulation sign is detected on the current road link after the turning-right or turning-left of the vehicle, the traffic sign determination section can consider the degree of adequacy of cooperation between the previous first and second traffic regulation signs detected and acquired on the previous road link before the turning-right or turning-left of the vehicle, i.e. a degree with which cooperation between the previous first and second traffic regulation signs detected and acquired on the previous road link can be considered to be adequate. Thus, when such a degree of adequacy of cooperation is high in the situation where no current first traffic regulation sign based on the picked-up image is detected on the current road link, the traffic sign determination section can execute the determination of the current final traffic regulation sign on the current road link on the basis of the previous first traffic regulation sign based on the picked-up image and the previous second traffic regulation sign based on the map data. In other words, in the case where the previous final traffic regulation sign on the previous road link is determined, the traffic sign determination section can use the determination of the previous final traffic regulation sign for the current road link. In this way, the traffic sign determination device of the present invention can avoid a state where no current final traffic regulation sign on the current road link is notified, i.e. a non-notified state of the current final traffic regulation sign on the current road link.

However, it is possible that an error exists in the notification of the current final traffic regulation sign on the current road link. Thus, according to the first aspect of the invention, the traffic sign determination devices can further consider a previous factor acquired on the previous road link and current factor acquired on the current road link (i.e., previous and current acquisition states), in order to reduce or lower the probability of an error existing in the notification of the current final traffic regulation sign. Here, examples of the previous and current factors include regulatory speeds, road types, etc. Thus, the traffic sign determination section acquires such previous and current factors from the map data and determines, on the basis of the previous and current factors as well, whether or not the final traffic regulation sign on the current road link should be notified. Namely, when no current first traffic regulation sign is detected on the current road link after the turning-right or turning-left of the vehicle, the traffic sign determination device of the present invention can determine the current first traffic regulation sign more accurately in consideration of not only the degree of adequacy of cooperation but also the previous and current acquisition states.

According to a second aspect depending on the aforementioned first aspect, the previous road link includes at least a last road link, and, when a last first traffic regulation sign detected on the last road link agrees with a last second traffic regulation sign acquired on the last road link, the traffic sign determination section determines that the degree of adequacy of cooperation is high. The traffic sign determination section executes determination of the current final traffic regulation sign, on condition that the previous factor agrees with the current factor.

According to the second aspect, the traffic sign determination section can use, as the degree of adequacy of cooperation, the last first and second traffic regulation signs detected and acquired on the last road link immediately before the turning-right or turning-left of the vehicle. More specifically, when the last first and second traffic regulation signs agree with each other, the traffic sign determination section can determine that the degree of adequacy of cooperation is high. In other words, when the probability that no error exists in the detection of the first traffic regulation sign based on the picked-up image and in the acquisition of the second traffic regulation sign based on the map data is high, the traffic sign determination device of the present invention can determine that the current final traffic regulation sign on the current road link should be notified.

In addition, according to the second aspect, the traffic sign determination device of the present invention does not always notify the current final traffic regulation sign when the degree of adequacy of cooperation is high. More specifically, the traffic sign determination device of the present invention can execute the determination of the current final traffic regulation sign, on condition that there is no change between previous and current factors such as previous and current road types (previous and current acquisition states). In this way, the traffic sign determination device of the present invention can lower the probability of an error existing in the notification of the current final traffic regulation sign.

According to a third aspect depending on the aforementioned second aspect, the previous road link further includes at least one previous road link preceding the last road link. When at least one previous first traffic regulation sign detected on the at least one previous road link agrees with at least one previous second traffic regulation sign acquired on the at least one previous road link, the traffic sign determination section raises the degree of adequacy of cooperation.

According to the third aspect, the traffic sign determination device can monitor, as the degree of adequacy of cooperation, not only the last road link immediately before the turning-right or -left of the vehicle but also a previous road link preceding the last road link. More specifically, when a previous first traffic regulation sign detected on the previous road link agrees with a previous second traffic regulation sign acquired on the previous road link, the traffic sign determination device of the invention can determine that the degree of adequacy of cooperation should be raised. In other words, when the last first traffic regulation sign agrees with the last second traffic regulation sign and also the previous first traffic regulation sign agrees with the previous second traffic regulation sign, the traffic sign determination device of the invention can set even higher the adequacy of the determination that the current final traffic regulation sign should be notified.

According to a fourth aspect depending on any one of the aforementioned first to third aspects, when no succeeding or following first traffic regulation sign is detected on a road link succeeding or following the current road link, the traffic sign determination section stops determination of a following final traffic regulation sign.

According to the fourth aspect, when no current first traffic regulation sign is detected on the current road link and no succeeding or following first traffic regulation sign is detected on the following road link, the traffic sign determination device of the invention uses the determination of the previous final traffic regulation sign for the current road link, but does not use the determination of the current final traffic regulation sign (i.e., determination based on the determination of the previous final traffic regulation sign) for the following road link. In other words, the traffic sign determination device of the invention assumes a rise in the probability that an error exists in the notification of the following final road regulation sign and stops determining the following final traffic regulation sign, to be on the safe side.

Further, according to a fifth aspect depending on any one of the aforementioned first to fourth aspects, when the number of lanes on the current road link changes, the traffic sign determination section stops determination of the current final traffic regulation sign.

According to the fifth aspect, when the number of lanes on the current road link changes, the traffic sign determination section determines the probability that an actual traffic regulation sign will change is high, and thus stops the determination of the current final traffic regulation sign.

According to a sixth aspect of the present invention, there is provided an improved traffic sign determination method, which comprises: detecting a first traffic regulation sign by performing an image recognition process on an image of an area in front of a vehicle picked up by an imaging section provided on the vehicle; using a position of the vehicle, acquiring a road link, including a second traffic regulation sign at the position of the vehicle, from a map data storage section storing map data that includes road link information related to roads constituting a map; and when no current first traffic regulation sign is detected on a current road link after turning-right or turning-left of the vehicle, determining, based on a degree of adequacy of cooperation between previous first and second traffic regulation signs detected and acquired on a previous road link before the turning-right or turning-left of the vehicle, whether or not a current second traffic regulation sign is selectable as a current final traffic regulation sign on the current road link. The degree of adequacy of cooperation is evaluated higher as the number of times, time length and/or distance over which the previous first traffic regulation sign agreed with the previous second traffic regulation sign increase; that is, the greater the number of times, time length and/or distance over which the previous first traffic regulation sign agreed with the previous second traffic regulation sign, the higher is evaluated the degree of adequacy of cooperation.

According to the sixth aspect, when no current first traffic regulation sign is detected on the current road link after the turning-right or turning-left of the vehicle, the traffic sign determination method can consider the degree of adequacy of cooperation between the previous first and second traffic regulation signs detected and acquired on the previous road link before the turning-right or turning-left of the vehicle. Here, the degree of adequacy of cooperation is evaluated higher as the number of times, time length and/or distance over which the previous first traffic regulation sign agreed with the previous second traffic regulation sign increase. Thus, when the degree of adequacy of cooperation is high in the situation where no current first traffic regulation sign based on the picked-up image is detected on the current road link, the traffic sign determination method can determine, based on a previous first traffic regulation sign based on the picked-up image and a previous second traffic regulation sign based on the map data, whether or not there is an error in the acquisition of the current second traffic regulation sign on the current road link (i.e., acquisition of the second traffic regulation sign based on the map data). In other words, the traffic sign determination method of the invention can determine, in consideration of the degree of adequacy of cooperation, whether or not the map has got old or out of date. When the map data is not out of date, the traffic sign determination method of the invention can select the current second traffic regulation sign acquired on the current road link. In this way, the traffic sign determination method of the invention can avoid a non-notified state of the current final traffic regulation sign on the current road link.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 4A is a diagram explanatory of example courses of travel preceding and following the example course of travel shown in FIG. 3A, and FIG. 4B is a diagram explanatory of example behavior preceding and following the example behavior shown in FIG. 3B.

DETAILED DESCRIPTION OF THE INVENTION

The following will describe preferred embodiments of the present invention in order to facilitate understanding of the basic principles of the invention, but it should be appreciated that the present invention is not limited to the described embodiments.

Figure 1:
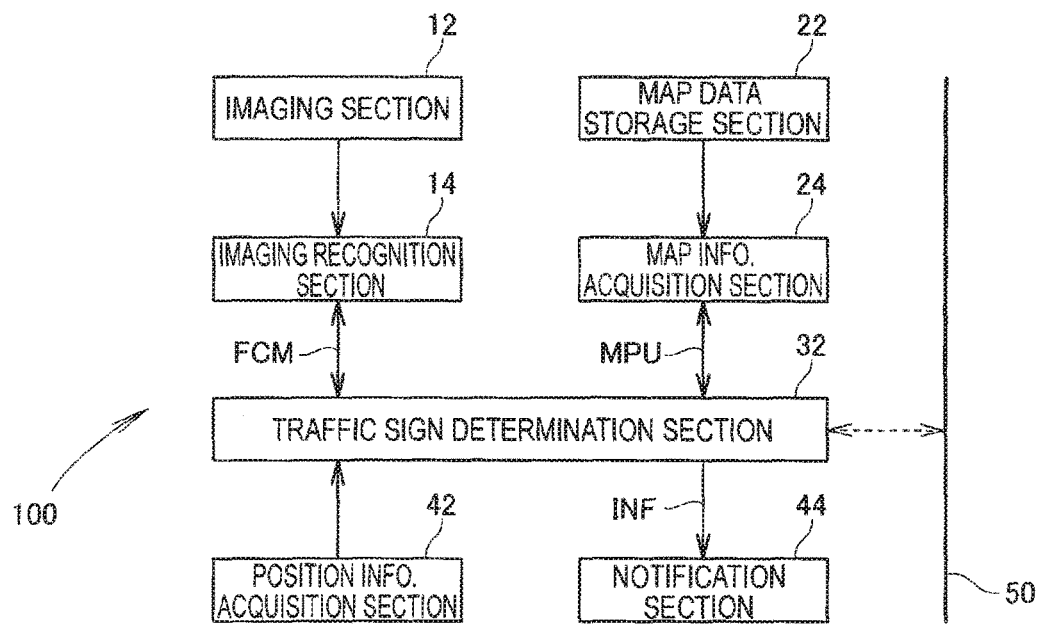
FIG. 1 is a block diagram showing an example overall construction of a traffic sign determination device according to an embodiment of the present invention.

FIG. 1 is a block diagram showing an example overall construction of a traffic sign determination device 100 according to an embodiment of the present invention. As shown, the traffic sign determination device 100 includes an image recognition section 14, a map information acquisition section 24 and a traffic sign determination section 32. The traffic sign determination device 100 further includes an imaging section 12, a map data storage section 22, a position information acquisition section 42 and a notification section 44. Needless to say, the traffic sign determination device 100 need not necessarily include all of the aforementioned components and may include one or more other components not shown here. In addition, the traffic sign determination device 100 of FIG. 1 is capable of inputting information or data from a vehicle-mounted network 50 and outputting information or data to the vehicle-mounted network 50.

The imaging section 12 shown in FIG. 1 is provided on or in a vehicle, e.g. in a passenger compartment, and can pick up an image of an area in front of the vehicle (as viewed in a traveling direction of the vehicle). Of course, the imaging section 12 may be provided in front of a mirror (rear view mirror) within the passenger compartment. As an alternative, the imaging section 12 may be one usable for a plurality of functions, such as a drive recorder function. Alternatively, the imaging section 12 may be disposed outside the vehicle, such as on the back of a car emblem, a front bumper or the like. Namely, the imaging section 12 may be disposed at any desired position of the vehicle as long as it can image an area in front of the vehicle (as viewed in the traveling direction of the vehicle). Preferably, the imaging section 12 includes imaging sensors (imaging elements), such as CCDs or COMS transistors, to pick up and generate an image in digital form. The imaging section 12 further includes an imaging lens for forming an image of a subject (a traffic sign or the like located in front of the vehicle) on image planes of the imaging sensors, and it is preferable that the imaging lens be automatically driven by an auto focus motor to be properly adjusted in position. In addition, the imaging section 12 may either continue outputting real-time picked-up images to the image recognition section 14 or output picked-up images to the image recognition section 14 at predetermined periodic or non-periodic timing.

The image recognition section 14 of FIG. 1 inputs a picked-up image in digital form from the imaging section 12 and performs an image recognition process on the input picked-up image. The image recognition section 14 can detect a traffic sign by determining whether a predetermined pattern of characters, figures and/or the like is present in the input picked-up image. In the illustrated example of FIG. 1, the image recognition section 14 detects a traffic regulation sign, from among various traffic signs, that prohibits vehicles from a particular driving activity or instructs vehicles to travel in accordance with a particular manner. For example, the traffic regulation sign includes regulatory speed (speed limit) information for prohibiting vehicles to travel at speeds higher than a predetermined speed (maximum speed) indicated by the regulatory speed information. In this way, the image recognition section 14 can detect from the input picked-up image a traffic regulation sign indicative for example of a regulatory speed, and output the thus-detected traffic regulation sign (such a detected traffic sign will hereinafter be referred to also as "first traffic regulation sign").

In the case where the imaging section 12 of FIG. 1 comprises a camera, the imaging section 12 and the image recognition section 14 can be referred to collectively as "Front Camera Module" or "FCM". Reference character "FCM" in FIG. 1 represents a traffic regulation sign (first traffic regulation sign) output from the image recognition section 14.

The map data storage section 22 of FIG. 1 has map data, including road link information, stored therein. The map data storage section 22 comprises, for example, a drive device, such as an SSD, HDD or DVD or a combination thereof, that is accessed by the map information acquisition section 24.

Figure 2:
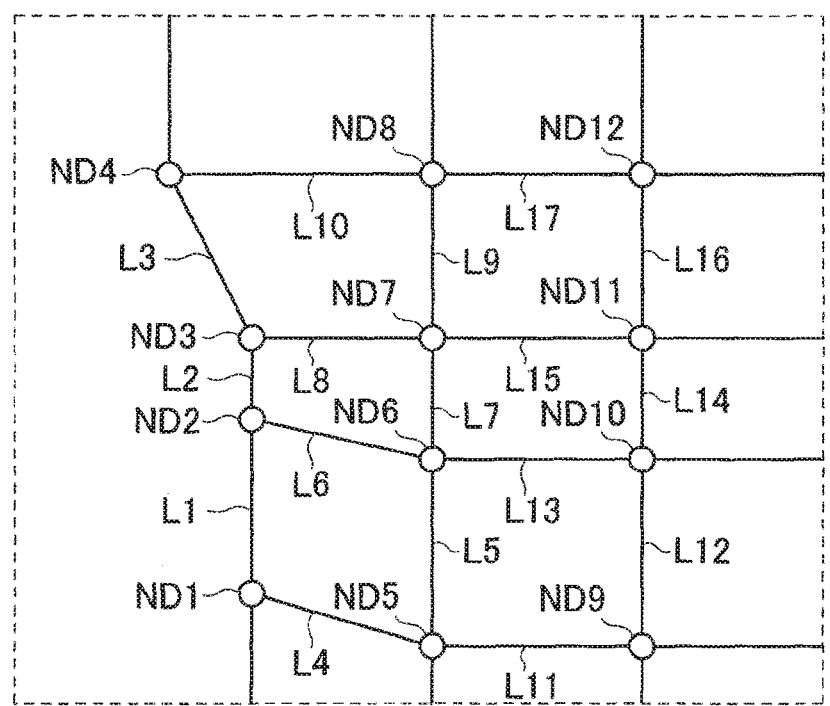
FIG. 2 is a diagram explanatory of road link information employed in the traffic sign determination device.

FIG. 2 is a diagram explanatory of the road link information that is information about roads constituting a map. In FIG. 2, a plurality of road links L1 to L17 are shown. Each of the road links (e.g., road link L1) is indicative of a road section between one node (e.g., node ND1) and another node (e.g., node ND2) immediately following the one node and includes a traffic regulation sign, such as a regulatory speed, of the road link; such a traffic regulation sign included in the road link information will hereinafter be referred to also as "second traffic regulation sign"). In addition, each of the road links L1 to L17 is assigned a respective link No. and may include a position (coordinates) of the traffic regulation sign (second traffic regulation sign), a distance from a start point, etc. Note that each of the nodes is assigned a respective node No. and includes a position (coordinates) of the node. Each of the nodes is, for example, an intersection although it may be other than an intersection.

The map information acquisition section 24 of FIG. 1 uses a current position of the vehicle to acquire from the map data storage section 22 a road link at the current position of the vehicle. For example, when the vehicle is traveling on the road link L1, the map information acquisition section 24 can acquire a regulatory speed (second traffic regulation sign) of the road link L1. In the illustrated example of FIG. 1, the position of the vehicle is acquired by the position information acquisition section 42, and input to the map information acquisition section 24, so that the map information acquisition section 24 can determine, on the basis of the input position of the vehicle, whether or not the vehicle has turned right or left. Alternatively, the map information acquisition section 24 may input the position of the vehicle and output to the traffic sign determination section 32 information indicative of whether or not the vehicle has passed a node (e.g., intersection) of that position, and the traffic sign determination section 32 may input the position of the vehicle and the information indicative of whether or not the vehicle has passed the node at that position, and then, for example, estimate a positional trajectory of the vehicle and determine whether the positional trajectory of the vehicle has changed in direction (traveling direction of the vehicle) after the vehicle passed the intersection.

In place of the position of the vehicle and the information indicative of whether or not the vehicle has passed an intersection, the traffic sign determination section 32 may input behavioral information of the vehicle to determine whether or not the vehicle has turned right or left. Here, the behavioral information of the vehicle includes a steering angle of the vehicle (steering wheel), a yaw rate of the vehicle, lateral acceleration of the vehicle (acceleration in a left-right direction perpendicular to the traveling direction of the vehicle), etc. When the behavioral information of the vehicle is input to the traffic sign determination device 100, for example, via the vehicle-mounted network 50 like a CAN (Controller Area Network), turning-right or turning-left of the vehicle may be detected using the behavioral information.

In addition, the map information acquisition section 24 can input the position of the vehicle to determine whether the road link has changed to another. Alternatively, the map information acquisition section 24 may input the position of the vehicle and output to the traffic sign determination section 32 the link No. of the road link at the position of the vehicle, so that the traffic sign determination section 32 can determine whether or not the road link has changed to another.

Note that the map data storage section 22 and the map information acquisition section 24 may be referred to collectively as "Map Positioning Unit" or "MPU". Further, reference character "MPU" of FIG. 1 represents a traffic regulation sign (second traffic regulation sign) output from the MPU or the map information acquisition section 24. Of course, the MPU may include the position information acquisition section 42 that comprises, for example, a GPS receiver. Of course, the position information acquisition section 42 may include, in place of or in addition to the GPS receiver, a position sensor, such as a gyro sensor and/or an acceleration sensor, a communication module (such as a WiFi (Wireless Fidelity) module or a telephone network module), etc. Here, the communication module can receive an electromagnetic wave from an electromagnetic wave transmission section (e.g., access point or base station), detect a position of the electromagnetic wave transmission section and a distance to the electromagnetic wave transmission section and thereby acquire the position of the vehicle.

For example, a regulatory speed (first traffic regulation sign) detected by the FCM and a regulatory speed (second traffic regulation sign) acquired by the MPU are input to the traffic sign determination section 32 of FIG. 1, so that the traffic sign determination section 32 can determine whether the two input regulatory speeds agree with, or match, each other. However, such a regulatory speed may not sometimes be detected by the FCM; namely, a traffic regulation sign indicative of a regulatory speed may not exist due to some reason. Further, no traffic regulation sign may not be provided on some road links. In addition, even where a traffic regulation sign is provided, a picked-up image representative of a traffic regulation sign may sometimes be generated due to presence of obstacles, such as trees, adjoining vehicles, rain or snow. Further, from some picked-up image representative of a traffic regulation sign, the traffic regulation sign may not be appropriately detected due to sunlight-related noise, such as flickering or reflection.

Particularly, the inventors of the present invention realized that, when the vehicle turns right or left, a probability with which a regulatory speed or the like is not detected by the FCM is not low.

When, for example, no regulatory speed (current first traffic regulation sign) is detected by the FCM on the current road link, the traffic signal determination section 32 can determine a current final traffic regulation sign by use of a degree of adequacy of cooperation between a previous first traffic regulation sign detected on a previous road link by the FCM and a previous second traffic regulation sign acquired on the previous road link by the MPU, i.e. a degree with which the cooperation between the previous first and second traffic regulation signs detected and acquired on the previous road link can be considered to be adequate. More specifically, when, for example, no regulatory speed (current first traffic regulation sign) is detected on the current road link by the FCM, and when the degree of adequacy of cooperation based on agreement between previous first and second traffic regulation signs detected and acquired on a previous road link by the FMC and the MPU, the traffic sign determination section 32 can determine that a current final traffic regulation sign (i.e., traffic sign to be notified to an occupant of the vehicle) is to be notified on the current road link.

For example, the traffic sign determination section 32 can determine whether the map data has got old or out of date, in view of the degree of adequacy of cooperation. When the degree of adequacy of cooperation is high, the traffic sign determination section 32 can determine that the map data is not old or out of date. When the map data is not old or out of date, the traffic sign determination section 32 can select a current second traffic regulation sign (second traffic regulation sign based on the map data) acquired on the current road link by the MPU.

In addition, the traffic sign determination section 32 can determine a current final traffic regulation sign by use of not only the degree of adequacy of cooperation but also other factors, such as a regulatory speed and a road type. More specifically, when no current first traffic regulation sign is detected on the current road link by the FCM, the traffic sign determination section 32 can determine a current final traffic regulation sign by use of not only the degree of adequacy of cooperation but also previous factors acquired on a previous road link by the MPU and current factors acquired on the current road link by the MPU (previous and current acquisition states). The traffic sign determination section 32 can acquire such previous and current factors from the map data to determine whether or not the current final traffic regulation sign on the current road link should be notified.

For example, the traffic sign determination section 32 can determine that the current final traffic regulation sign on the current road link should be notified, on condition that a previous regulatory speed and a current regulatory speed agree with each other. Because the determination of the current final traffic regulation sign is made on condition that the current regulatory speed has not changed from the previous regulatory speed, the traffic sign determination device 100 can reduce a probability of an error existing in the notification of the current final traffic regulation sign.

Reference character "INF" in FIG. 1 represents a current final regulatory traffic sign (i.e., traffic sign to be notified to the vehicle occupant) output from the traffic sign determination section 32. The notification section 44, which comprises for example a display, can visually display, as the current final regulatory traffic sign, one of a first traffic regulation sign (e.g., regulatory speed) detected by the FCM and a second traffic regulation sign (e.g., regulatory speed) acquired by the MPU (i.e., determination result or selection result of the traffic sign determination section 32). Thus, the vehicle occupant can recognize the current final traffic regulation sign. Needless to say, the notification section 44 may alternatively comprise a speaker and may notify the vehicle occupant of the current final traffic regulation sign by audible sound or voice.

The traffic sign determination device 100 of FIG. 1 may be referred to also as "traffic sign recognition device" or "TSR device". Further, the traffic sign determination device 100 of FIG. 1 may constitute, for example, a navigation device or a navigation system. In other words, a processing section of the navigation device connected to the FCM may have, for example, functions of the map information acquisition section 24 and the traffic sign determination section 32. As another alternative, the processing section of the navigation device connected to the imaging section 12 may have, for example, functions of the image recognition section 14, the map information acquisition section 24 and the traffic sign determination section 32. In addition, the traffic sign determination device 100 may constitute a drive recorder; in other words, the imaging section 12 may be a camera of the drive recorder.

Figure 3A:
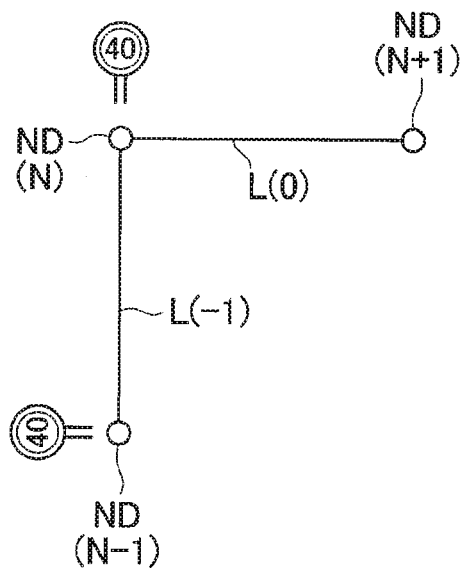
FIG. 3A is a diagram explanatory of an example of a course of travel of the vehicle.
Figure 3B:
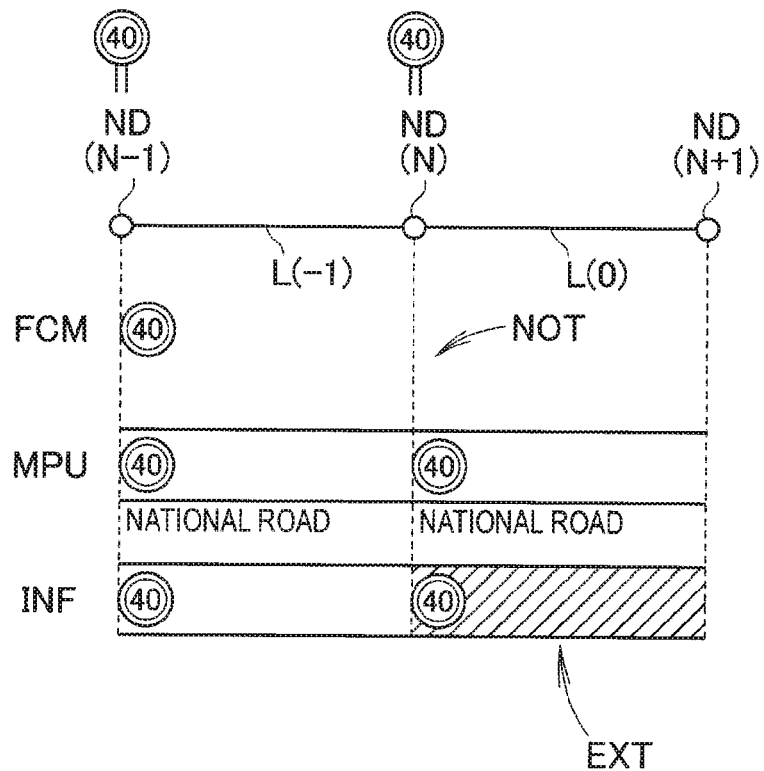
FIG. 3B is a diagram explanatory of an example operation or behavior of the traffic sign determination device.

FIG. 3A is a diagram explanatory of an example of a course of travel of the vehicle, and FIG. 3B is a diagram explanatory of an example operation or behavior of the traffic sign determination device 100. As shown in FIG. 3A, the vehicle turns right, for example, at an intersection that is the end point (end point node ND(N)) of a road link L(−1) and then travels on a road link L(0). When the vehicle travels along such a course, the traffic sign determination device 100 behaves as follows. In FIG. 3B, as the vehicle enters the road link L(−1), the image recognition 14 (also referred to as "FCM") detects, for example, a regulatory speed of 40 km/h (maximum speed), and the map information acquisition section 24 (also referred to as "MPU") acquires a regulatory speed of 40 km/h (maximum speed). Because, in this case, the regulatory speed detected by the FCM agrees with the regulatory speed acquired by the MPU, a final road regulation sign (INF) output from the traffic sign determination section 32 is the regulatory speed of 40 km/h (maximum speed).

Then, as the vehicle turns right, i.e. the vehicle enters the road link L(0) after passing through the road link L(−1), the traffic sign determination section 32 outputs, for example, a regulatory speed of 40 km/h (maximum speed) as a final traffic regulation sign (INF) (see arrow EXIT in FIG. 3B). In other words, when the FCM cannot detect any actual regulatory speed on the road link L(0) as the vehicle enters the road link L(0), the traffic sign determination section 32 can output a regulatory speed of 40 km/h as a final traffic regulation sign (INF) instead of outputting nothing (see arrow EXIT in FIG. 3B).

Namely, when the regulatory speed (first traffic regulation sign) detected on the last road link L(−1) by the FCM agrees with the regulatory speed (second traffic regulation sign) acquired on the last road link L(−1) by the MPU, the traffic sign determination section 32 of FIG. 1 determines that the degree of adequacy of cooperation is high and thus can output the regulatory speed of 40 km/h on the last road link L(−1). When no current first traffic regulation sign is detected on the current road link L(0) after the turning-right of the vehicle, the traffic sign determination section 32 can continue, on the current road link L(0), the output on the last road link L(−1) based on the high degree of adequacy of cooperation. In this way, the traffic sign determination device 100 can avoid a state where no current final traffic regulation sign on the current road link is notified, i.e. a non-notified state of the current final road regulation sign on the current road link L(0).

In FIG. 3B, the regulatory speed of 40 km/h acquired on the last road link L(−1) by the MPU before the turning-right of the vehicle agrees with the regulatory speed of 40 km/h acquired on the current road link L(0) by the MPU after the turning-right of the vehicle. However, there is a possibility that the regulatory speed acquired on the current road link L(0) will change when the vehicle turns right or left. Although FIGS. 3A and 3B show that the actual regulatory speed provided on the current road link L(0) is 40 km/h, the following assume that the actual regulatory speed provided on the current road link L(0) is 30 km/h, and that the map data too indicates 30 km/h (assumed regulatory speed) as a regulatory speed on the current road link L(0).

In the case where the actual regulatory speed provided on the current road link L(0) is 30 km/h as noted above, the regulatory speed of 30 km/h (assumed regulatory speed) acquired on the current road link L(0) by the MPU no longer agrees with the regulatory speed of 40 km/h (FIG. 3B) acquired on the last road link L(−1) by the MPU. Namely, in the case where the regulatory speed of 40 km/h acquired on the last road link L(−1) by the MPU before the turning-right of the vehicle does not with the regulatory speed of 30 km/h (assumed regulatory speed)) acquired on the current road link L(0) by the MPU after the turning-right of the vehicle, the traffic sign determination section 32 can discontinue the output of the last road link L(−1) (see arrow EXT in FIG. 3B). Thus, the traffic sign determination section 32 outputs nothing as the final traffic regulation sign (INF) on the current road link L(0), although the traffic sign determination section 32 may alternatively output the regulatory speed of 30 km/h (assumed regulatory speed)) acquired on the current road link L(0).

Further, in the illustrated example of FIG. 3B, the MPU acquires not only the regulatory speed of 40 km/h but also a road type ("National Road" in FIG. 3B. More specifically, when the vehicle is traveling along the course shown in FIG. 3A, the traffic sign determination section 32 can determine whether or not the road type of the road link L(−1) before the turning-right of the vehicle and the road type of the road link L(0) after the turning-right of the vehicle agree with each other. On condition that the road type (e.g., "National Road") acquired by the MPU does not change on the current road link L(0), the traffic sign determination section 32 can determine that the current final traffic regulation sign (INF) should be notified. Preferably, the traffic sign determination section 32 may determine that the current final traffic regulation sign (INF) should be notified, on condition that both the regulatory speed (e.g., "40 km/h") and the road type (e.g., "National Road") acquired by the MPU do not change on the current road link L(0). Needless to say, the traffic sign determination section 32 uses or considers the degree of adequacy of cooperation as well as previous and current factors (such as regulatory speeds and road types) acquired on previous and current road links.

Note that the map data may store therein, as other information than regulatory speeds, number of lanes of roads in place of or in addition to road types (e.g., national roads), and that the traffic sign determination section 32 can determine, in consideration of all or a portion of such information (previous and current states of acquisition by the MPU), a possibility that the actual traffic regulation sign, such as a regulatory speed, provided on the current road link L(0) will change. When such a possibility is low, the traffic sign determination section 32 can determine that the current final traffic regulation sign (INF) should be notified.

Although FIG. 3A shows the vehicle turning right, the vehicle may sometimes turn left. When the FCM and the MPU operate generally as shown in FIG. 3B as the vehicle turns left, the traffic sign determination section 32 operates in generally the manner as described above.

Further, FIG. 4A is a diagram explanatory of example courses of travel preceding and following the example course of travel shown in FIG. 3A, and FIG. 4B is a diagram explanatory of example behavior preceding and following the example behavior shown in FIG. 3B. As shown in FIG. 4A, the vehicle travels on the road link L(−1) after having traveled on road links L(−K), . . . , L(−2). Thus, the traffic sign determination section 32 can monitor, as the degree of adequacy of cooperation, not only the last road link L(−1) immediately before the turning-right of the vehicle but also the road links L(−K), . . . , L(−2) preceding the last road link L(−1). After having traveled on the road link L(0), the vehicle travels on the road link L(1). Thus, the traffic sign determination section 32 can determine whether or not a following first traffic regulation sign (indicative for example of a regulatory speed) has been detected on a following road link (such as the next road link L(1)).

As shown in FIG. 4B, the last regulatory speed (first traffic regulation sign) detected on the last road link L(−1) by the FCM agrees with the last regulatory speed (second traffic regulation sign) acquired on the last road link L(−1) by the MPU, but also previous regulatory speeds (first traffic regulation signs) detected on the previous road links L(−K), . . . , L(−2), preceding the last road link L(−1), by the FCM agree with previous regulatory speeds (second traffic regulation signs) acquired on the on the previous road links L(−K), . . . , L(−2) acquired by the MPU. In such a situation, the traffic sign determination section 32 can raise or increase the degree of adequacy of cooperation (i.e., validity of the determination that the current final traffic regulation sign (INF) should be notified on the current road L(0)). In other words, if a rate of agreement between results of detection by the FCM and results of acquisition by the MPU on the road links L(−1), L(−2), . . . , L(−K) in FIG. 4B is, for example, 100%, then the degree of adequacy of cooperation can be set, for example, at 100%. When the regulatory speed (40 km/h in FIG. 4B) detected on the last road link L(−1) detected by the FCM does not agree with the regulatory speed (assumed regulatory speed of 30 km/h) acquired on the last road link L(−1) by the MPU, the above-mentioned rate of agreement and the degree of adequacy of cooperation decrease.

Although the number of the previous road links L(−K), . . . , L(−2) is K−1 in FIG. 4B, the number "K−1" of the previous road links to be considered by the traffic sign determination section 32 may be K=1 (see FIG. 3B). Preferably, however, "K−1" is equal to or greater than "1" (i.e., K is an integral number equal to or greater than "2"). More preferably, "K−1" is equal to or greater than "2" (i.e., K is an integral number equal to or greater than "3"). In the case where the number of the previous road links L(−K), . . . , L(−2) is plural, it is preferable that the previous road links L(−K), . . . , L(−2) to be considered by the traffic sign determination section 32 run continuously with one another, and that the last road link L(−1) and the previous road link L(−2) too run continuously with each other.

The traffic sign determination section 32 can employ, as the degree of adequacy of cooperation, the rate of agreement between results of detection by the FCM and results of acquisition by the MPU on the road links L(−1), L(−2), . . . , L(−K). Here, a weighting coefficient set per road link may be either a fixed value or a variable value. In the case where the weighting coefficient set per road link is a variable value, the traffic sign determination section 32 may set the weighting coefficient at a value that increases as a distance from the road link in question to the current road link L(0) decreases.

Note that, not only the number of times the previous results of detection by the FCM agreed with the previous results of acquisition by the MPU (i.e., number of agreements) but also a total time (length) for which the previous results of detection by the FCM agreed with the previous results of acquisition by the MPU (i.e., time of agreement) may be considered as the rate of agreement between previous results of detection by the FCM and previous results of acquisition by the MPU. For example, the time of agreement between the results of detection by the FCM and the results of acquisition by the MPU on the last and previous road links L(−1), L(−2), . . . , L(−K) in FIG. 4B is a total time required for the vehicle to pass through all of the road links from the road link L(−K) to the road link L(0). Further, a total of distances where the results of detection by the FCM agreed with the results of acquisition by the MPU (distance of agreement) may be considered. For example, the distance of agreement is a total distance from the road link L(−K) to the road link L(0).

FIG. 4B shows an example where the rate of agreement is 100%, but when the result of detection on the road link L(−2) by the FCM does not agree with the result of acquisition on the road link by the MPU, the rate of agreement based on the number of agreements decreases from K/K× 100% to K−1/K×100%. Similarly, the rate of agreement based on the time of agreement decreases from (total time)/(total time)×100% to (total time−time required for the vehicle to pass through the road link L(−2))/total time× 100%. Similarly, the rate of agreement based on the distance of agreement decreases from (total distance)/(total distance)×100% to (total distance−distance of the road link L(−2))/total distance×100%.

When the degree of adequacy of cooperation exceeds a predetermined threshold value, and on condition that a previous regulatory speed (e.g., regulatory speed of 40 acquired only on the road link L(−1) by the MPU) agrees with a current regulatory speed (e.g., regulatory speed of 40 acquired on the current road link L(0) by the MPU), the traffic sign determination section 32 can output, as the final traffic regulation sign (INF), the regulatory speed of 40 km/h (see arrow EXIT in FIG. 4B).

When the vehicle enters one of the following road links (e.g., next road link L(1)) and no next first road regulation sign (e.g., regulatory speed) is detected on the next road link L(1) by the FCM (see arrow NOT2 in FIG. 4B), the traffic sign determination section 32 outputs nothing as a next final traffic regulation sign (INF) (see arrow NONE in FIG. 4B). More specifically, when no next first road regulation sign (e.g., regulatory speed) is detected on the road link L(0), immediately after turning-right of the vehicle, by the FCM (see arrow NOT1 in FIG. 4B) and no next first road regulation sign (e.g., regulatory speed) is detected also on the next road link L(1) by the FCM (see arrow NOT2 in FIG. 4B), the traffic sign determination section 32 can stop continuation of the output of the last road link L(−1) (see arrow EXIT in FIG. 4B) on the next road link L(1) (see arrow NONE in FIG. 4B). Then, in view of a possible rise in the probability of an error existing in the notification of the next final road regulation sign (INF), the traffic sign determination section 32 may stop determining the next final traffic regulation sign (INF), to be on the safe side.

By the way, in the illustrated example of FIG. 4B, the MPU acquires not only the regulatory speed (e.g., 40 km/h) and the road type (e.g., national road) but also the number of lanes (e.g., three lanes in the illustrated example). On condition that the regulatory speed (40 km/h), the road type (national road) and/or the number of lanes (three lanes) acquired by the MPU do not change while the vehicle is traveling along the course of travel as shown FIG. 4A, the traffic sign determination section 32 can determine that the current final traffic regulation sign (INF) should be notified (see arrow EXIT in FIG. 4B).

In a case where the MPU does not have the numbers of lanes prestored therein, the traffic sign determination section 32 may determine whether or not the number of lanes detected on the last road link L(−1) by the FCM agrees with the number of lanes detected on the current road link L(0) by the FCM. If the number of lanes of the current road link has changed from that of the last road link, the traffic sign determination section 32 can determine that there is a high probability that the actual road regulation sign will change and thereby stop determination and notification of the current final traffic regulation sign (INF).

Although FIG. 4A shows the vehicle turning right, the vehicle may sometimes turn left. When the FCM and the MPU operate generally as shown in FIG. 4B as the vehicle turns left, the traffic sign determination section 32 operates in generally the same manner as described above.

Figure 5:
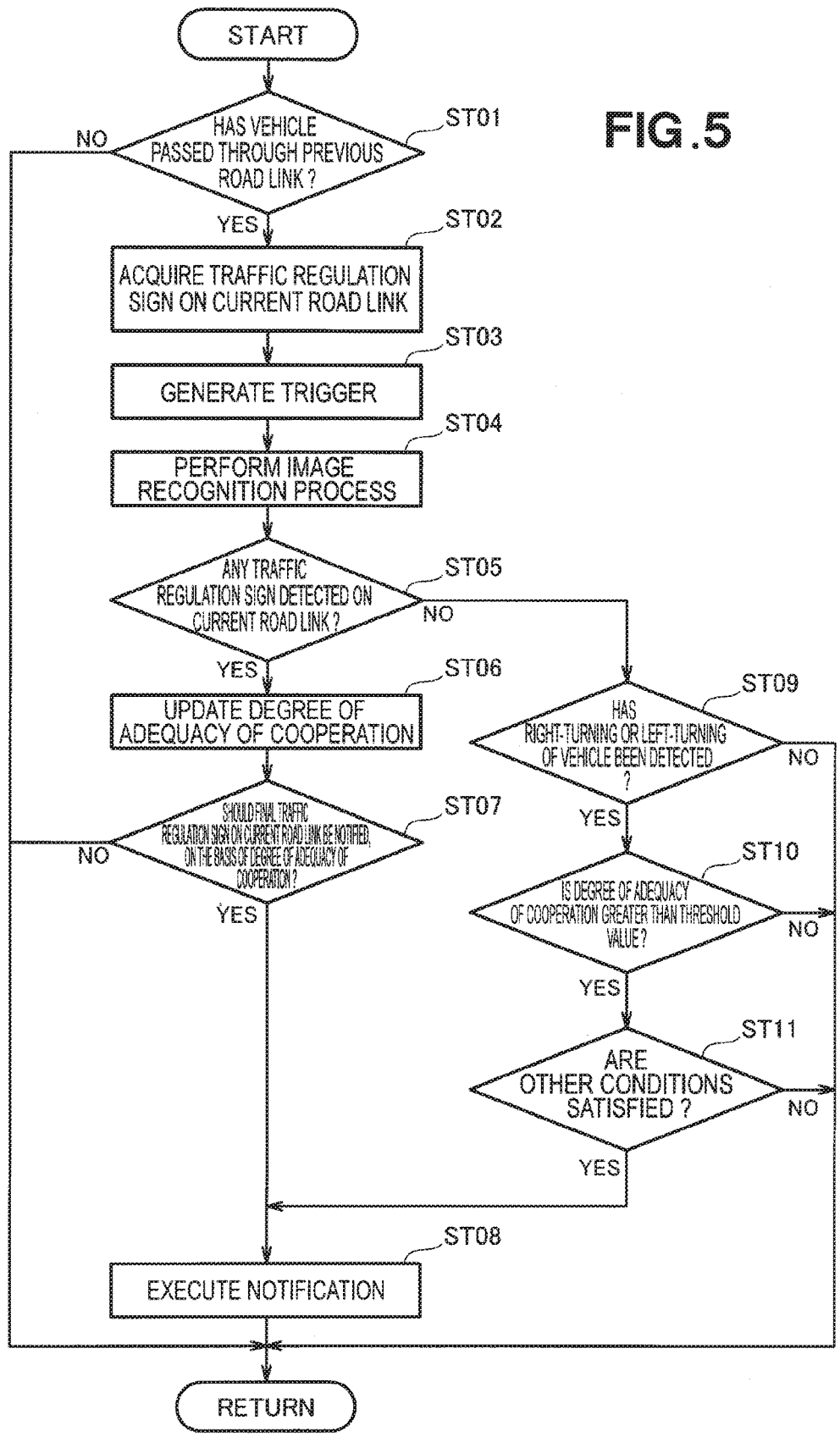
FIG. 5 is a flow chart showing example behavior of the traffic sign determination device 100 of FIG. 1.

FIG. 5 is a flow chart showing example behavior or operation of the traffic sign determination device 100 of FIG. 1. The traffic sign determination section 32 of FIG. 1 determines, at step ST01 of FIG. 5, whether or not the vehicle has passed through a previous road link. More specifically, the traffic sign determination section 32 of FIG. 1 can determine whether one road link has changed or switched to another road link. If one road link has changed to another road link as determined at step ST01, the traffic sign determination section 32 causes the map information acquisition section 24 to acquire map data of a traffic regulation sign (second traffic regulation sign) etc., at step ST02. Preferably, the map information acquisition section 24 also acquires, for example, a road type related to the traffic regulation sign.

Then, the traffic sign determination section 32 generates a trigger at step ST03 of FIG. 5. In response to the trigger, the image recognition section 14 performs an image recognition process on a picked-up image at step ST04. Timing for the traffic sign determination section 32 to generate such a trigger is when the position of the vehicle approaches the end point of a road link, when the position of the vehicle approaches a position of a traffic regulation sign (second traffic regulation sign) of a road link, when the image recognition section 14 inputs a picked-up image, a desired combination of the aforementioned timing, or the like.

If a traffic regulation sign (first traffic regulation sign) indicative for example of a regulatory speed is included in the picked-up image, the image recognition section 14 can output the traffic regulation sign (first traffic regulation sign) of the current road link to the traffic sign determination section 32. If no traffic regulation sign (first traffic regulation sign) indicative for example of a regulatory speed is included in the picked-up image, the image recognition section 14 cannot output the traffic regulation sign (first traffic regulation sign) of the current road link to the traffic sign determination section 32.

Then, at step ST05 of FIG. 5, the traffic sign determination section 32 determines whether any traffic regulation sign (first traffic regulation sign) has been detected on the current road link by the image recognition section 14. If any traffic regulation sign (first traffic regulation sign) has been detected on the current road link by the image recognition section 14 as determined at step ST05, the traffic sign determination section 32 further determines whether the detected traffic regulation sign (first traffic regulation sign) agrees with the traffic regulation sign (second traffic regulation sign) acquired by the map information acquisition section 24 and then updates the degree of adequacy of cooperation, at step ST06. More specifically, if the result of detection by the imaging section 14 and the result of acquisition by the map information acquisition section 24 on the current road link agree with each other, the traffic sign determination section 32 sets the degree of adequacy of cooperation, based for example on the rate of agreement, at a high value or raises the degree of adequacy of cooperation. Whereas the rate of agreement is typically based on the number of agreements, it may be based on the time of agreement and/or distance of agreement in place of or in addition to the number of agreements.

Here, the degree of adequacy of cooperation includes not only a previous degree of adequacy of cooperation between a previous first traffic regulation sign detected on a previous road link by the image recognition section 14 and a previous second traffic regulation sign acquired on the previous road link by the map information acquisition section 24, but also a current degree of adequacy of cooperation between a current first traffic regulation sign detected on the current road link by the image recognition section 14 and a current second traffic regulation sign acquired on the current road link by the map information acquisition section 24. However, when a first traffic regulation sign is detected on the current road link by the image recognition section 14, the degree of adequacy of cooperation may be only a current degree of adequacy of cooperation.

At step ST07 of FIG. 5, the traffic sign determination section 32 of FIG. 1 determines, for example on the basis of the current degree of adequacy of cooperation, whether or not a current final traffic regulation sign on the current road link should be notified. For example, when the current first traffic regulation sign detected on the current road link by the image recognition section 14 and the current second traffic regulation sign acquired on the current road link by the map information acquisition section 24 agree with each other, the traffic sign determination section 32 selects the current second traffic regulation sign acquired on the current road link by the map information acquisition section 24, and the notification section 44 notifies the vehicle occupant of the current second traffic regulation sign as the current final traffic regulation sign, at step ST08.

When no actual regulatory speed is detected on the current road link by the image recognition section 14 as indicated, for example, by arrow NOT in FIG. 3B, the traffic sign determination section 32 determines, at step ST09 in FIG. 5, whether or not the vehicle has turned right or left. If the vehicle has turned right or left as determined at step ST09, the traffic sign determination section 32 further determines, at step ST10 in FIG. 5, whether the degree of adequacy of cooperation updated at step ST06 above is greater than the predetermined threshold value. If the updated degree of adequacy is greater than the predetermined threshold value, the traffic sign determination section 32 further determines, at step ST11 in FIG. 5, whether one or more other conditions are satisfied. If no other condition is set, the traffic sign determination section 32 selects, for example, the current second traffic regulation sign acquired on the current road link or continuation of the traffic regulation sign notified on a previous road link, and the notification section 44 outputs the current final traffic regulation sign at step ST08.

It is preferable that any one or all of the following conditions A to C be preset in the traffic sign determination section 32 as the aforementioned other conditions.

(Condition A) The last regulatory speed acquired on the last road link by the map information acquisition section 24 agrees with the current regulatory speed acquired on the last road link by the map information acquisition section 24.

(Condition B) The last road type acquired on the last road link by the map information acquisition section 24 agrees with the current road type acquired on the last road link by the map information acquisition section 24.

(Condition C) The number of lanes detected or acquired on the last road link by the image recognition section 14 or the map information acquisition section 24 agrees with the number of lanes detected or acquired on the current road link by the image recognition section 14 or the map information acquisition section 24.

By considering the other conditions like Conditions A to C above, the traffic sign determination section 32 can accurately determine the current final traffic regulation sign.

In addition, at the time of execution of step ST08 by way of steps ST09 to ST11, it is preferable that Condition D that the vehicle is now traveling on the current road link be considered by the traffic sign determination section 32.

Thus, after the vehicle having turned right passes through the current road link, the traffic sign determination section 32 can determine the next final traffic regulation sign by use of the degree of adequacy of cooperation. In other words, when the image recognition section 14 does not detect any traffic regulation sign (first traffic regulation sign) on the next road link following the current road link, the traffic sign determination section 32 can stop determining the next final traffic regulation sign, in response to which the notification section 44 can stop the output of the current final traffic regulation sign having been executed at ST08 by way of steps ST09 to ST11. The traffic sign determination section 32 assumes a rise in the probability of error existing in the notification of the next final road regulation sign on the next road link, and the notification section 44 can stop outputting the next final traffic regulation sign on the next road link, to be on the safe side.

Note that aforementioned Condition D may alternatively define the condition that the vehicle is traveling on the current and next road links. In such a case, when the image recognition section 14 does not detect any traffic regulation sign on the next road link following the current road link and not detect any traffic regulation sign on a further next road link following the next road link, the traffic sign determination section 32 may select, for example, the current second traffic regulation sign acquired on the next road link or continuation of the traffic sign determination notified on the current road as the next final traffic regulation sign, and then stop determining a further next final traffic regulation sign.

Namely, aforementioned Condition D means that the vehicle is traveling within a predetermined distance (e.g., several hundred meters). When the vehicle is traveling more than several hundred meters after having passed through an intersection, the traffic sign determination section 32 can stop determining the final road regulation sign. Because a traffic regulation sign is provided every several hundred meters in some countries, the traffic sign determination section 32 can assume a rise in the probability of an error existing in the notification of the final road regulation sign and can stop determining the final traffic regulation sign, to be on the safe side.

Finally, it should be appreciated that the present invention is not limited to the above-described illustrative embodiment and that various modifications thereof are also possible within the scope recited in the appended claims.

What is claimed is:

1. A traffic sign determination device comprising:
   an image capturing device which captures an image of an area in front of a vehicle, the image capturing device being provided on the vehicle;
   an image recognition section which detects a first traffic regulation sign by performing an image recognition process on the image captured by the image capturing device;
   a memory which stores map data that includes road link information related to roads constituting a map;
   a map information acquisition section which, using a current position of the vehicle, acquires a road link including a second traffic regulation sign at the current position of the vehicle, from the map data stored in the memory;
   a notification device which notifies an occupant of the vehicle of a current final traffic regulation sign based on the first and second traffic regulation signs; and
   a traffic sign determination section which, when no current first traffic regulation sign is detected on a current road link after turning-right or turning-left of the vehicle, determines the current final traffic regulation sign on the current road link, based on previous first and second traffic regulation signs detected and acquired on a previous road link before turning-right or turning-left of the vehicle, which are also stored in the memory, and based on a current second traffic regulation sign on the current road link.

2. The traffic sign determination device according to claim 1, wherein:
   the previous road link includes at least a last road link, and when a last first traffic regulation sign detected on the last road link agrees with a last second traffic regulation sign acquired on the last road link,
   the traffic sign determination section executes determination of the current final traffic regulation sign, on condition that the previous second traffic regulation sign agrees with the current second traffic regulation sign.

3. The traffic sign determination device according to claim 1, wherein, when no following first traffic regulation sign is detected on a road link following the current road link, the traffic sign determination section stops determination of a following final traffic regulation sign.

4. The traffic sign determination device according to claim 1, wherein, when a number of lanes on the current road link changes, the traffic sign determination section stops determination of the current final traffic regulation sign.

5. A traffic sign determination method comprising:
capturing an image of an area in front of a vehicle using an image capturing device provided on the vehicle;
detecting a first traffic regulation sign by performing an image recognition process on the captured image;
using a current position of the vehicle, acquiring a road link, including a second traffic regulation sign at the current position of the vehicle, from a memory storing map data that includes road link information related to roads constituting a map;
notifying an occupant of the vehicle of a current final traffic regulation sign based on the first and second traffic regulation signs; and
when no current first traffic regulation sign is detected on a current road link after turning-right or turning-left of the vehicle, determining, based on a rate of agreement between previous first and second traffic regulation signs detected and acquired on a previous road link before turning-right or turning-left of the vehicle, which are also stored in the memory, whether or not a current second traffic regulation sign is selectable as the current final traffic regulation sign on the current road link.

6. The traffic sign determination device according to claim 1,
wherein the traffic sign determination section:
acquires a rate of agreement between the previous first and second traffic regulation signs before turning-right or turning-left of the vehicle; and
executes determination of the current final traffic regulation sign, based on the acquired rate of agreement and on the current second traffic regulation sign on the current road link.

7. The traffic sign determination device according to claim 6,
wherein:
the previous road link includes a plurality of previous road links preceding a last road link; and
when the previous first traffic regulation sign detected on the previous road link agrees with the previous second traffic regulation sign acquired on the previous road link, the traffic sign determination section raises the rate of agreement.

8. The traffic sign determination device according to claim 1, further comprising a controller configured to receive and process the first traffic regulation sign recognized by the image recognition section and the second traffic regulation sign acquired by the map information acquisition section.

9. The traffic sign determination device according to claim 1, wherein a controller area network of the vehicle provides information about turning-right or turning-left of the vehicle to the traffic sign determination section.

\* \* \* \* \*